United States Patent [19]

MacLennan et al.

[11] Patent Number: 5,004,026
[45] Date of Patent: Apr. 2, 1991

[54] FELLING HEAD

[76] Inventors: Charles MacLennan, 153 Cote St., Charles, Hudson, Quebec J0P 1J0; Douglas D. Hamilton, 5858 Cote des Neiges, Suite 215, Montreal, Quebec H3S 1Z1; Robert M. Palfy, 320 5th Street, Laval, Quebec H7N 1Z4, all of Canada

[21] Appl. No.: 417,765

[22] Filed: Oct. 6, 1989

[51] Int. Cl.⁵ .............................................. A01G 23/08
[52] U.S. Cl. ................... 144/3 D; 144/34 R; 144/336
[58] Field of Search ................. 144/2.7, 3 D, 34 R, 144/34 E, 335, 336, 338, 339

[56] References Cited

U.S. PATENT DOCUMENTS

| | | | |
|---|---|---|---|
| 3,875,983 | 4/1975 | Kurelek | 144/34 R |
| 3,911,981 | 10/1975 | Tucek | 144/34 R |
| 4,153,087 | 5/1979 | Stoychoff | 144/34 E |
| 4,175,598 | 11/1979 | Stoychoff | 144/34 E |
| 4,243,258 | 1/1981 | Dauwalder | 144/34 E |
| 4,738,291 | 4/1988 | Isley | 144/241 |
| 4,909,291 | 3/1990 | Tremblay | 144/34 R |
| 4,921,024 | 5/1990 | Wiemeri et al. | 144/34 R |

FOREIGN PATENT DOCUMENTS

| | | |
|---|---|---|
| 815870 | 6/1969 | Canada. |
| 936446 | 11/1973 | Canada. |
| 978449 | 11/1975 | Canada. |
| 992849 | 7/1976 | Canada. |
| 1252025 | 4/1989 | Canada. |

Primary Examiner—W. Donald Bray
Attorney, Agent, or Firm—Shlesinger, Arkwright & Garvey

[57] ABSTRACT

An improved tree felling head that minimizes splintering of the butt ends of trees while felling them, and that also minimizes losing them off the felling head after they are cut. The felling head has retaining means for loosely retaining the trees cut or being cut within tree receiving cradles provided on the felling head.

6 Claims, 10 Drawing Sheets

FELLING HEAD

This invention is directed toward an improved tree felling head.

The invention is more particularly directed towards an improved tree felling head of the type that accumulates cut trees.

The invention is also directed toward a method of cutting and accumulating trees with the improved felling head.

Felling heads for cutting trees are well known as are felling heads that both cut and accumulate trees. One type of felling head employs means to tightly grip the tree to be cut. While the tree is tightly gripped, cutting means on the head are moved and operated to cut through the gripped tree. The gripping means then release the cut tree. Grapple means may be provided on the felling head to accumulate one or more released cut trees while cutting continues.

Cutting through tightly gripped trees can result in the butt end of the tree splintering as the cut nears completion. This is due to the tree occasionally being highly stressed when tightly gripped by the felling head. A tree with a splintered butt end is not as valuable as an unsplintered tree.

One way to minimize splintering of the butt ends is to cut the trees without tightly gripping them. It is known to provide felling heads that cut free standing trees. This type of felling head has a fixed cutting means, usually a large circular saw, with a butt plate over a portion of the saw. The felling head is moved to have the saw cut the free standing tree which then rests on the butt plate. Grapple means are provided on the felling head to accumulate one or more cut trees off the butt plate while cutting continues. Often however, the just cut tree on the butt plate is unstable and it can fall of the felling head before it is trapped by the accumulating arms.

The problems associated with splintering in cut trees, and with tree loss off the felling head, can be minimized by improving the handling of the trees by the felling head. It is therefore the purpose of the present invention to provide an improved tree felling head having improved tree handling means. It is more particularly a purpose of the present invention to provide an improved tree felling head with improved tree handling means that minimize splintering in cut trees. It is also more particularly another purpose of the present invention to provide an improved tree felling head with improved tree handling means that minimizes both splintering in cut trees and loss of cut trees off the felling head.

In accordance with the present invention there is provided a felling head with cradle means for loosely receiving a tree and with retaining means on the felling head for loosely retaining the tree in the cradle means.

In one embodiment of the invention, the felling head employs movable cutting means. The felling head is manoeuvred to place the standing tree to be cut within the cradles and the retaining means is operated to loosely retain the standing tree within the cradles while the cutting means is operated and moved to cut through the tree. The loosely retained tree is free to have some movement while being cut and therefore is not as likely to splinter as a tree that is cut while tightly held. Preferably, the felling head is provided with grapple means to accumulate one or more cut trees while still being able to loosely retain the next tree being cut.

In another embodiment of the invention, the felling head employs a fixed cutting means. A butt plate is provided on top of a portion of the cutting means. The felling head is manoeuvred to have the cutting means cut through a free standing tree. The cut tree ends up on the butt plate within cradle means provided on the felling head. The retaining means on the felling head are immediately operated at the conclusion of cutting to loosely retain the cut tree on the butt plate and within the cradles to prevent it from falling off the felling head. The felling head is provided with grapple means to accumulate one or more cut trees while still being able to loosely retain the next cut tree.

The invention is particularly directed toward a tree felling head having a frame with tree cutting means at the bottom of the frame. Vertically spaced-apart cradles are provided on the frame for loosely receiving a tree therein. Retaining means are provided on the frame between the cradles for loosely retaining a tree within the cradles. Means are also provided on the frame for supporting a cut tree by its butt end while retained in the cradles.

Preferably, the felling head includes grapple means on the frame between the cradles to accumulate cut trees against the cradles in the frame.

In one embodiment, means are provided for movably mounting the tree cutting means on the frame to cut through a free-standing tree that is positioned within the cradles by manoeuvring the felling head. The movable tree cutting means support the cut tree by its butt end while it is loosely retained in the cradles.

In another embodiment, the tree cutting means are fixed on the frame, and the felling head is manoeuvred to have the fixed cutting means cut through a free standing tree. The cut tree support means comprise a butt plate covering a portion of the tree cutting means.

The invention is also directed toward a method for falling trees using a felling head which comprises: positioned the felling head to locate a standing tree within vertically spaced-apart tree cradles on the felling head; moving retaining means to a closed position to loosely retain the standing tree within the cradles; and cutting the standing tree while loosely retained within the cradles.

The invention is further directed toward a method for felling trees using a felling head which comprises; manoeuvring the felling head to have a fixed cutting means on the head cut through a free standing tree, the cut tree resting on a butt plate and within tree receiving cradles on the felling head; and moving retaining means to a closed position to loosely retain the cut tree on the butt plate and within the cradle means.

The methods preferably include the step of tightly gripping the cut tree against the cradles with grapple means to hold the cut tree while moving the head to the next standing tree to be cut.

The invention will now be described in detail having reference to the accompanying drawings in which.

Figure 1:
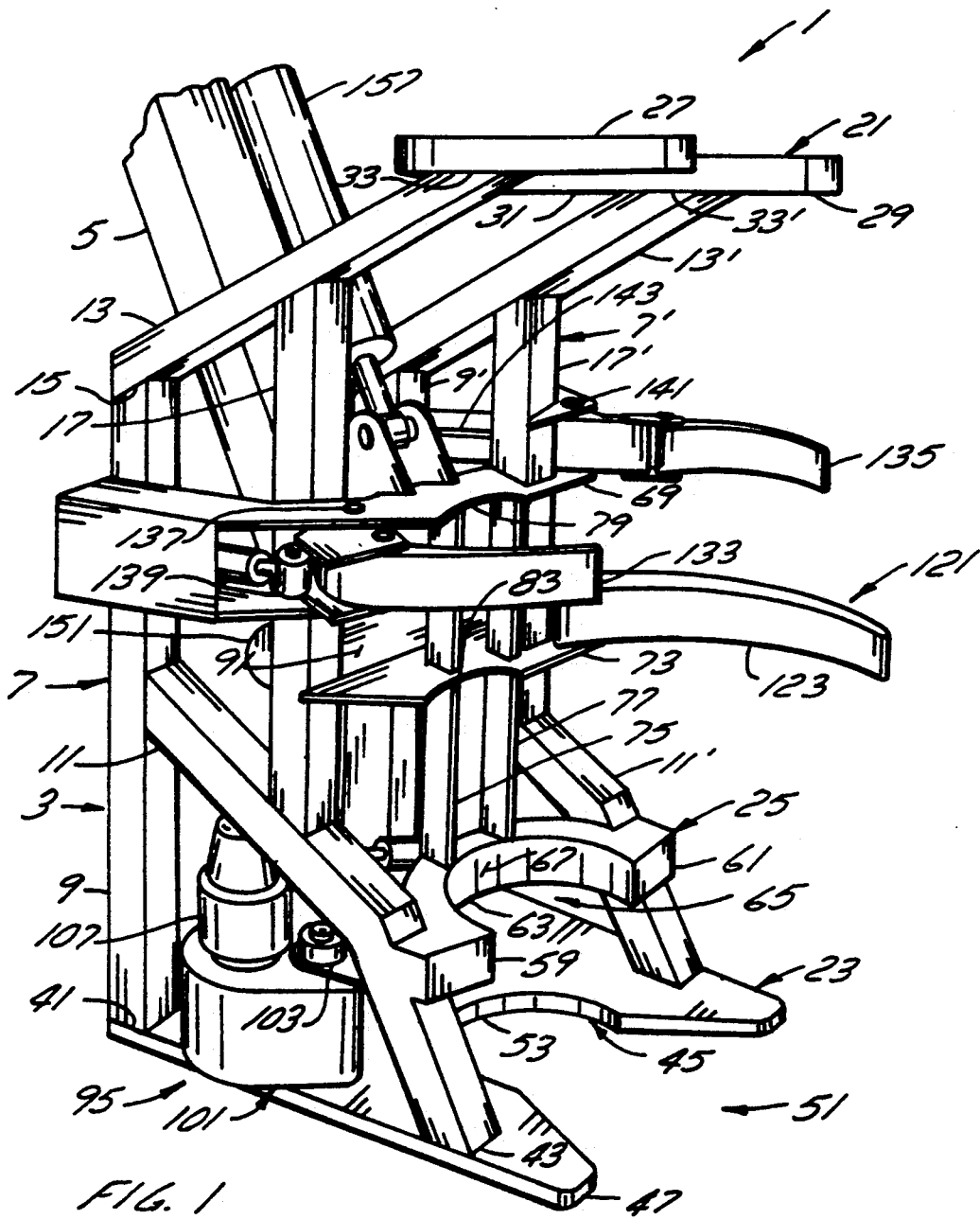
FIG. 1 is a perspective view of one embodiment of the felling head.
Figure 2:
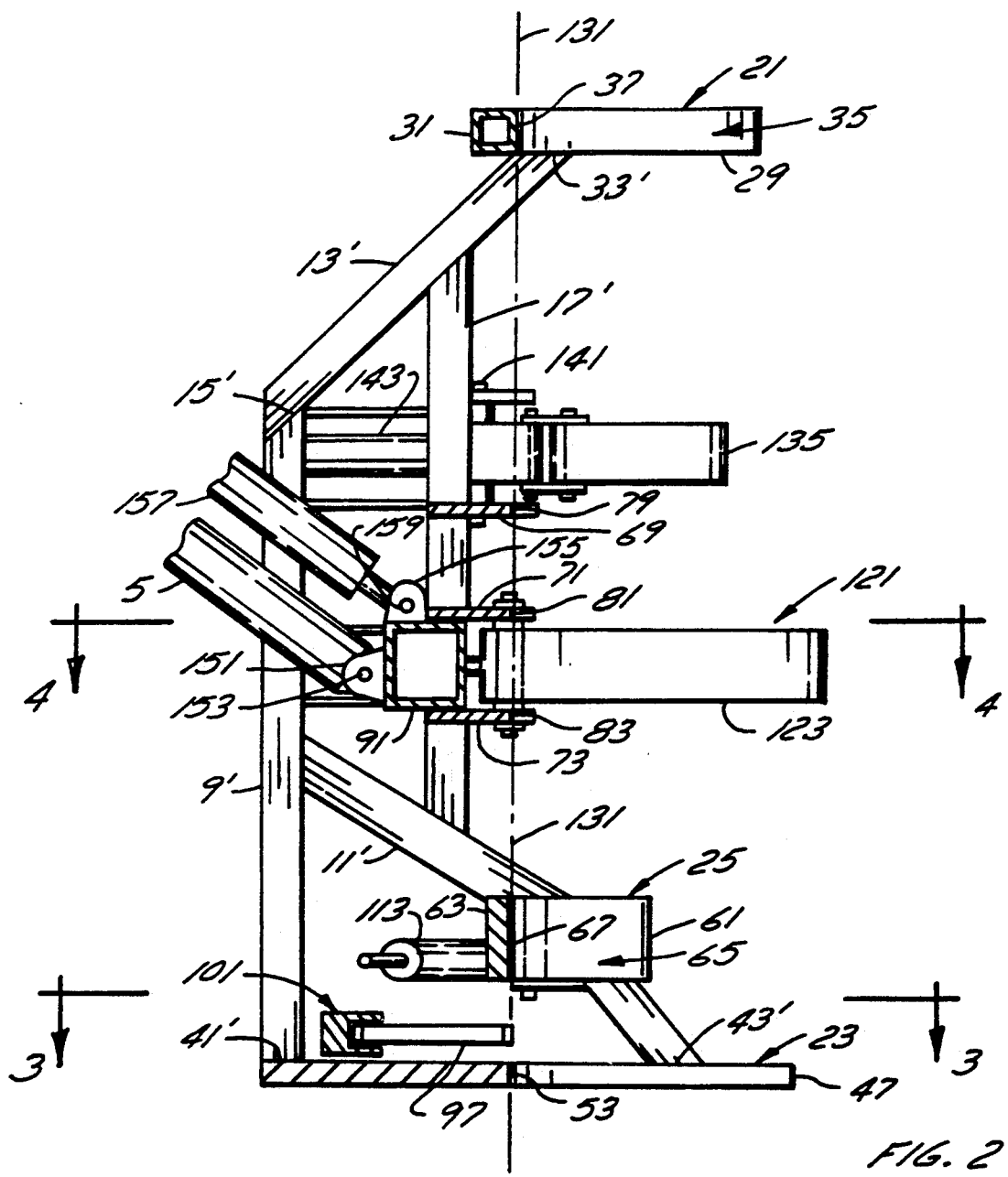
FIG. 2 is a vertical cross-sectional view of the felling head.

The felling head 1 of the present invention in one embodiment has, as shown in FIGS. 1 and 2 a frame 3 that is adapted to be pivotally mounted on the end of a boom 5 carried by a logging vehicle (not shown).

The frame 3 has two spaced-apart, normally upright, side frames 7, 7'. Both side frames 7, 7' are identical so only one will be described in detail. Side frame 7 has an upright rear frame member 9. A first angled frame member 11 extends downwardly and forwardly from about the midpoint of the rear frame member 9. A second angled frame member 13 extends upwardly and forwardly from the top end 15 of the rear frame member 9. An upright front frame member 17 extends between the two angled frame members 11, 13, located in front of, and generally parallel to, the rear frame member 9.

The two side frames 7, 7' are joined together by top, bottom and middle tree-receiving cradles 21, 23, 25. The top cradle 21 comprises a normally horizontal U-shaped structural member having parallel side legs 27, 29 joined by a curved end 31. The cradle 21 is joined, near its end 31, to the free top ends 33, 33' of the second angled frame members 13, 13' of the side frames 7, 7'. The top cradle 21 opens forwardly with its opening 35 at the front of the frame 3 with its base 37 toward the back of the frame.

The bottom cradle 23 comprises a flat, generally rectangular, structural member joined to the bottom ends 41, 41' of the rear frame members 9, 9' and to the bottom ends 43, 43' of the first angled frame members 11, 11'. The flat member extends forwardly of the first angled frame members 11, 11'. A generally U-shaped cutout 45 extends rearwardly into the flat member from its front edge 47, with the opening 51 of the cutout 45 at the front of the frame 3 and its base 53 toward the back of the frame.

The middle cradle 25 is located a short distance above the bottom cradle 23 and comprises a U-shaped structural member having side legs 59, 61 joined by a curved end 63. The legs 59, 61 are joined to the first angled members 11, 11'. The middle cradle 25 opens forwardly with its opening 65 at the front of the frame 3 and its base 67 towards the back of the frame.

The side frames 7, 7' can further joined by three vertically spaced-apart, horizontal cross-plates 69, 71, 73 extending across the front of, and between, the front frame members 17, 17'. Horizontally spaced-apart, vertical stiffening plates 75, 77 extend between the cross-plates 69, 71, 73 and middle cradle 25. Shallow cutouts 79, 81, 83 can be provided in the front edges of the cross-plates 69, 71, 73. The cutouts 79, 81, 83 are vertically aligned with the bases 37, 53, 67 of the cradles 21, 23, 25. A horizontal cross-beam 91 can also be provided in about the middle of the frame 3 extending between the side frames 7, 7'.

Figure 3:
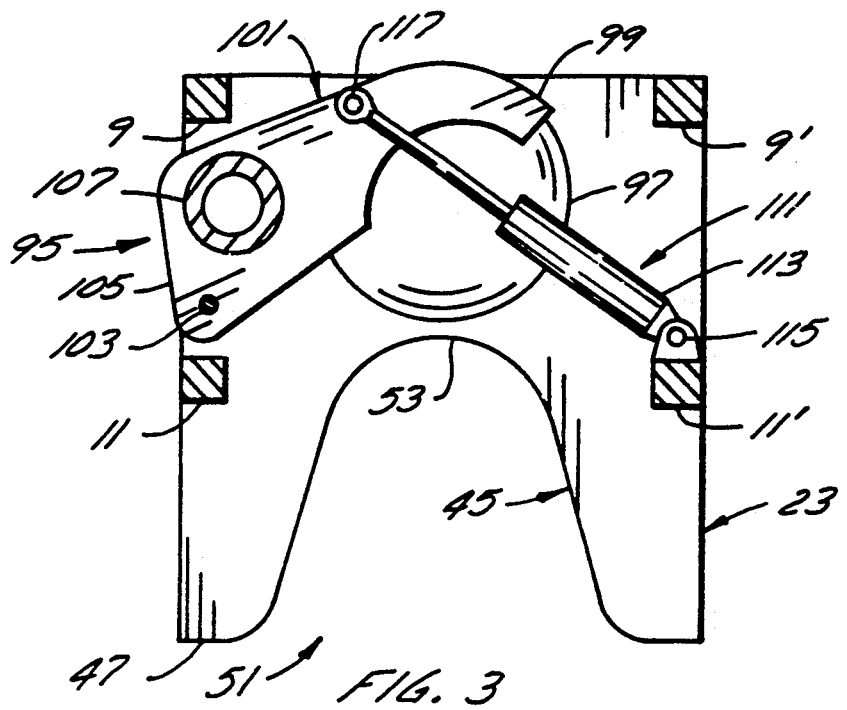
FIG. 3 is a cross-sectional view taken along line 3—3 in FIG. 2.

Means 95 are mounted on the felling head 1 for cutting a standing tree. The cutting means 95, as shown in FIG. 3, comprise a circular, rim-driven saw 97 mounted at the free end 99 of a horizontally swinging arm 101. The swinging arm 101 is mounted on the bottom cradle 23 just beneath the middle cradle 25. A vertical pivot pin 103 mounts the arm 101 at its other end 105 to the bottom cradle 23. The pivot pin 103 is located just behind the first angled frame member 11 of sdie frame 7 and is also mounted to it. A hydraulic motor 107 is mounted on the arm 101 adjacent its other end 105. The motor 107 operates means (not shown) to drive the saw 97 by its rim as is well known. An example of such a rim-driven saw is shown in U.S. Pat. No. 4,690,185 issued Sept. 1, 1987.

Moving means are provided for swinging the arm 101 about pivot pin 103 to move the saw 97 from an inoperative position rearwardly of the base 53 of the cutout 45 in the bottom cradle 23 to a cutting position moving over the cutout 45. The moving means 111 comprises a hydraulic actuator 113 pivotally mounted at one end by pivot means 115 to the back of the first angled frame member 11' of the side frame 7'. The other end of the actuator is mounted via a pivot means 117 to the swinging arm 101 at a pivot spaced rearwardly from pivot pin 103. Shortening of actuator 113 will swing the arm 101 over the cutout 45 with the saw 97 cutting through a tree located in the cutout 45 when motor 107 is operated.

Figure 4:
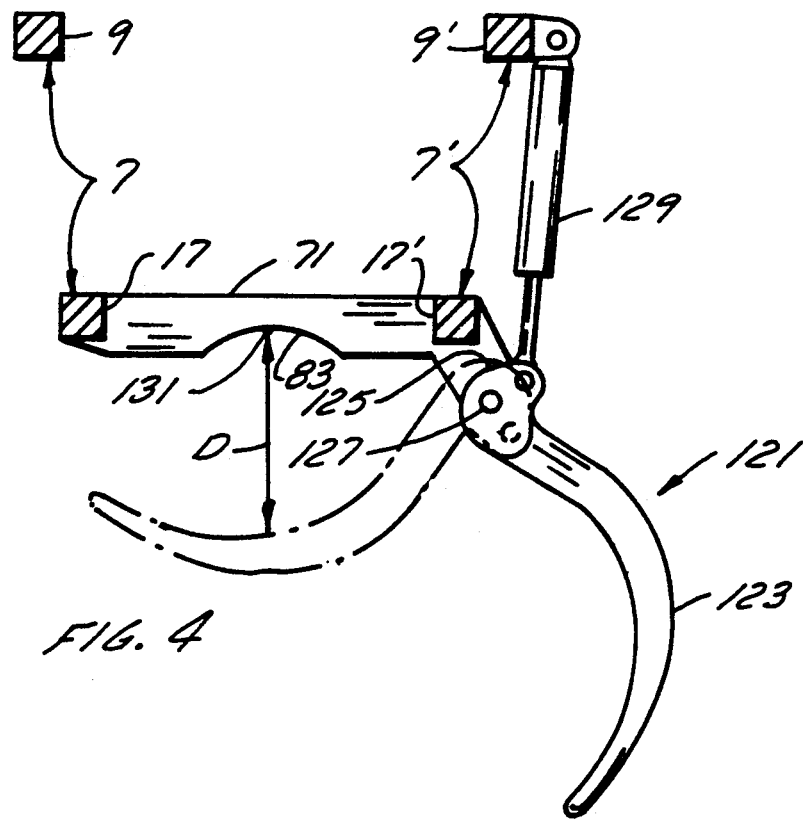
FIG. 4 is a cross-sectional view taken along line 4—4 in FIG. 2.

In accordance with the present invention, retaining means 121 are mounted on the frame 3 for loosely retaining a standing tree in the cradles 21, 23, 25 while it is being cut by the saw 97. The retaining means 121, as shown in FIG. 4, can comprise a single curved arm 123 pivotally mounted at one end 125 by a vertical pivot pin 127 between the lower and middle cross-plates 71, 73. The pivot pin 127 is located in front and to the outside of the front frame member 17'. A hydraulic actuator 129 is mounted on the outside of the side frame 7' for swinging the retaining arm 123 about its pivot pin 127 between an inoperative, open position where the arm extends forwardly and outwardly, and an operative, closed position where the arm extends transversely across the front of the frame 3 effectively closing the openings 35, 51 and 65 of the cradles 21, 23, 25. The retaining arm 123, the actuator 129, and their mounting on the frame 3, are structurally designed to have the arm 123 located a specific distance "D" from an imaginary vertical line 131 containing the bases 37, 63, 67 of the cradles 21, 23, 25 when the arm 123 is in its operative, closed position. In this position, the actuator 129 is at its maximum stroke. The distance "D" is usually sufficient to allow a number of cut trees to be accumulated within the cradles without normally having the arm 123, in its operative closed position, contact these trees and particularly the next tree to be cut. This distance "D" is preferably about sixteen inches.

The felling head 1 also carries grapple means on the frame 3 between the top and middle cradles 21, 25 to accumulate cut trees. The grapple means are well known and comprise a pair of grapple arms 133, 135 with one grapple arm 133 pivotally mounted on the side frame 7 just above the retaining arm 123 and the other grapple arm 135 pivotally mounted on the other side frame 7' just above the one grapple arm 133. Grapple arm 133 is moved about a pivot pin 137, mounted between the top and middle cross-plates 69, 71 by a hydraulic actuator 139 mounted on the side of the first side frame 7. The grapple arm 135 is moved about a pivot pin 141, mounted on the front frame member 17' and top cross-plate 69, by a hydraulic actuator 143 mounted on the side of the second side frame 7'. The pivot mountings 137, 141 of the grapple arms 133, 135 are located rearwardly of the pivot mounting 127 of the retaining arm 123.

Brackets 151 extend rearwardly from the back center of the cross-beam 91. A pivot pin 153 rotatably mounts the end of the boom 5 to the brackets 151. A pair of brackets 155 are also provided on the top center of the cross-beam 91. The end of a hydraulic actuator 157, mounted on the boom 5, is pivotally connected to the brackets 155 by a pivot pin 159.

Figure 5:
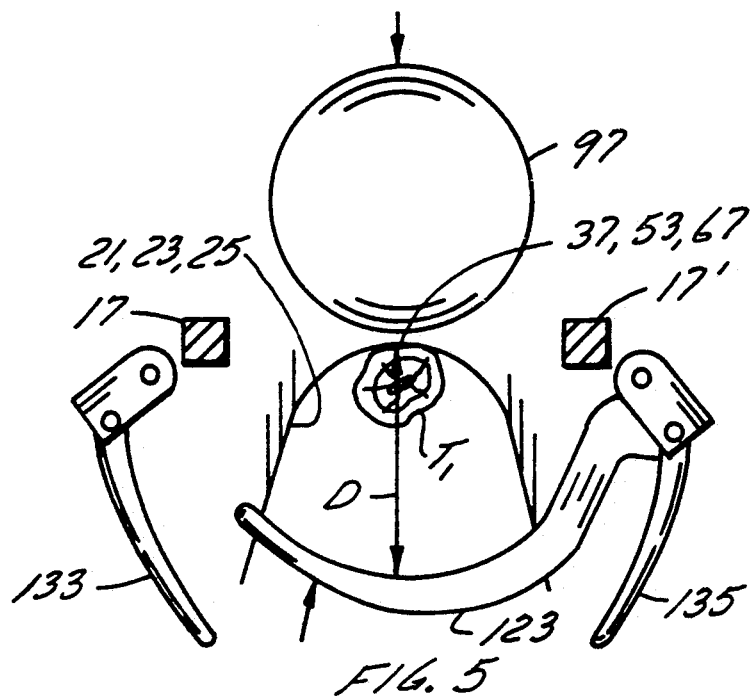
FIGS. 5 to 8 are schematic views showing the sequence of operations of the principle components of the felling head.
Figure 6:
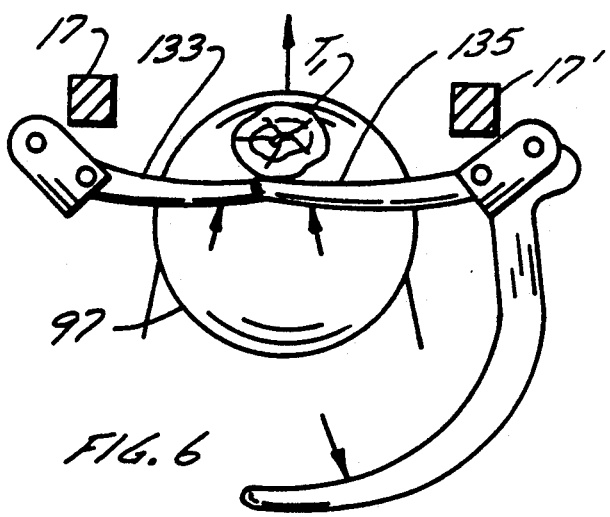
Figure 7:
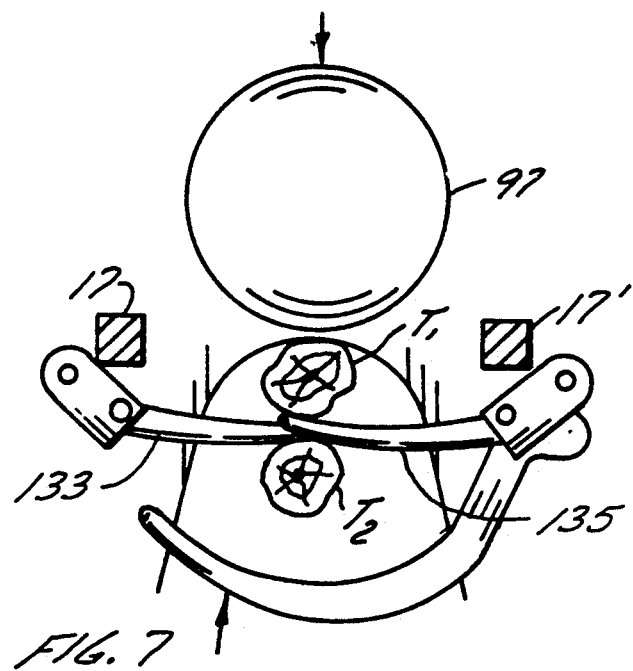
Figure 8:
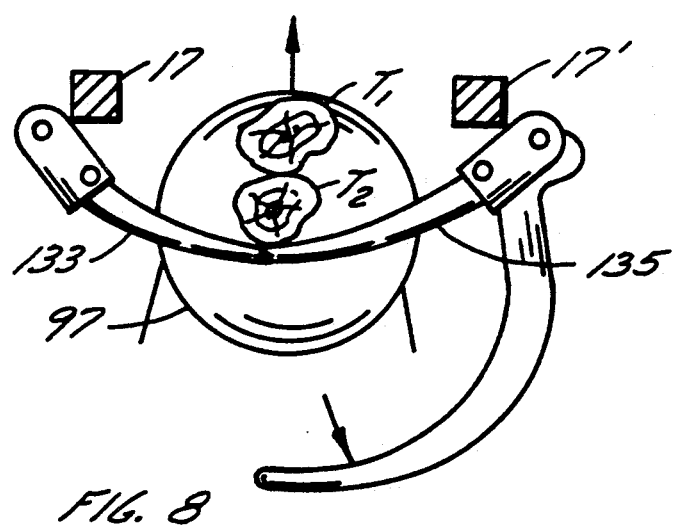

In operation, the felling head 1 is manoeuvred by the boom 5 and actuator 157 into an upright position where a tree "T₁" to be felled is positioned within the cradles 21, 23, 25 are shown in FIG. 5. The head 1 can be manoeuvred to have the tree abut one or more of the bases 37, 53, 67 of the cradles. The actuator 129 is next operated to move the retaining arm 123 to its operative closed position. The retaining arm 123 is moved to an operative closed position where it extends transversely across the front of frame 3 effectively closing the mouths 35, 51, 65 of the cradles 21, 23, 25. The arm 123 thus loosely holds the tree "T₁" in the cradles. Actuator 113 is next operated, as is motor 107, to swing the saw 97 across and to have it cut through the tree "T₁", while the tree is loosely held in the felling head as shown in FIG. 6. When the tree is cut through, it rests on the now stopped saw 97 while the grapple arms 133, 135 are moved by actuators 139, 143 to tightly grip the cut tree "T₁" against the bases 37, 67 of the cradles 21, 25. Retaining arm 123 is now opened up and the saw 97 is swung back to its inoperative position. The felling head 1, carrying cut tree "T₁" with grapple arms 133, 135 is now positioned again to locate a second tree "T₂" to be cut within the cradles 21, 23, 25 in front of the grapple arms 133, 135. The retaining arm 123 is again moved to loosely hold the second tree "T₂" within the cradles 21, 23, 25 in front of the grapple arms 133, 135 as shown in FIG. 7. The saw 97 is again operated and moved over the cutout 45 to cut through the second tree "T₂" while it is loosely held in the cradles. After cutting through the second tree "T₂", the saw is stopped, and the grapple arms 133, 135 open as shown in FIG. 8. Both trees "T₁", "T₂" rest on the saw 97 while the grapple arms 133, 135 close to now tightly grip both cut trees "T₁", "T₂". The retaining arm 123 is then opened up and the saw 97 is swung back to its inoperative position. The felling head 1 is now ready to be moved to a third tree or to a cut tree unloading position.

Figure 9:
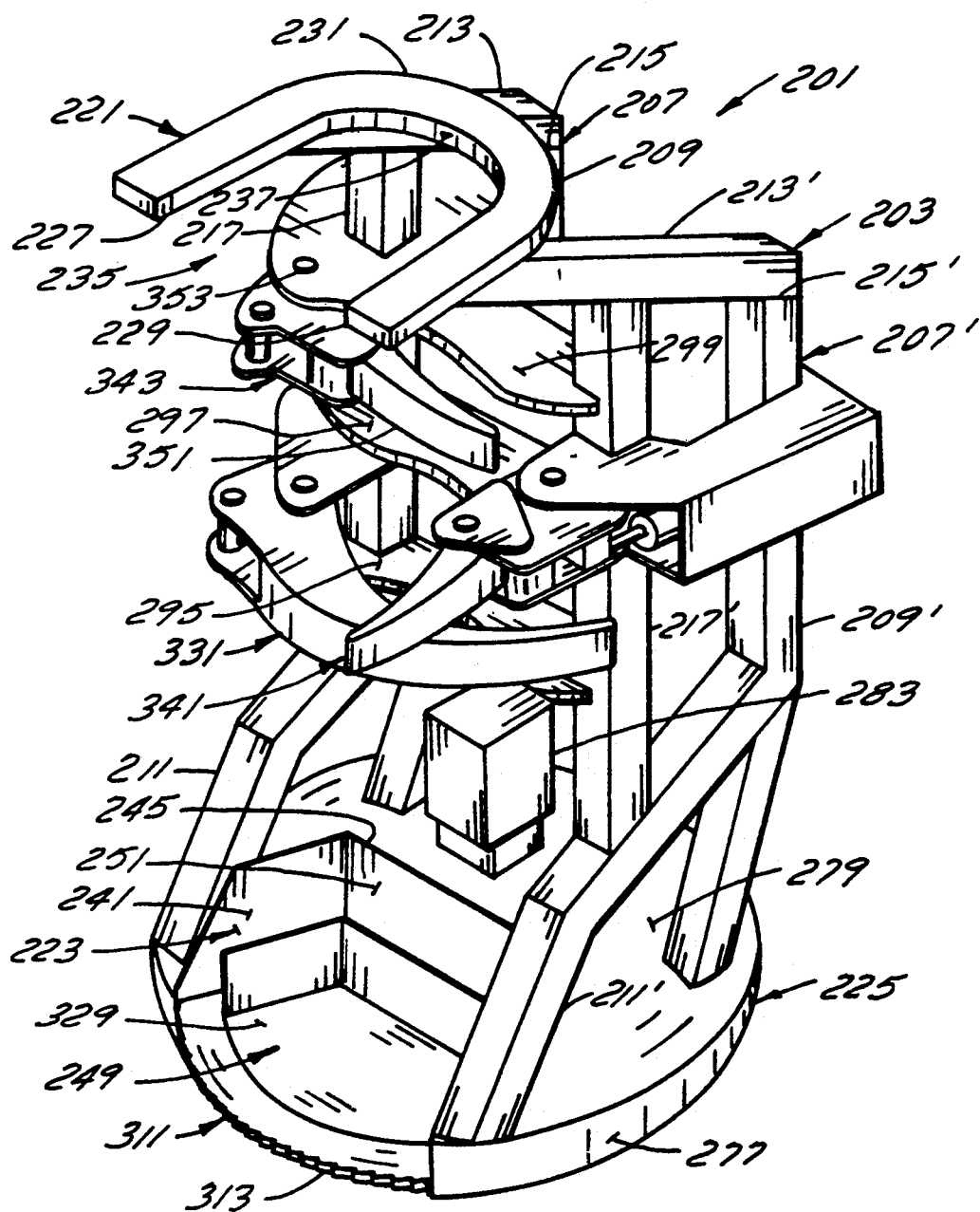
FIG. 9 is a perspective view of another embodiment of the felling head of the present invention.
Figure 10:
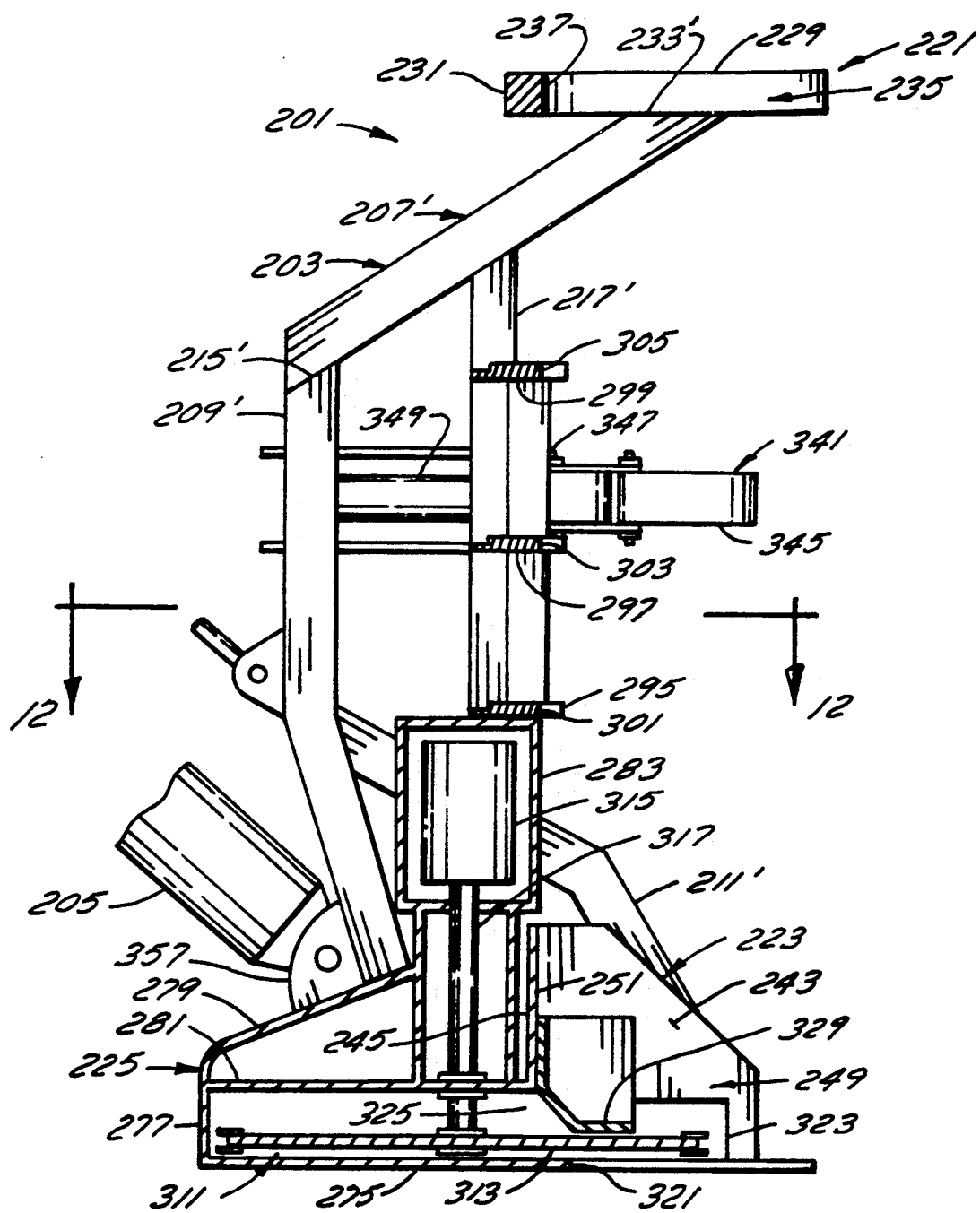
FIG. 10 is a vertical cross-sectional view of the felling head.

In another embodiment of the invention shown in FIGS. 9 and 10, the felling head 201 has a frame 203 that is adapted to be mounted on the end of a boom 205 carried by a logging vehicle (not shown).

The frame 203 has two spaced-apart normally upright, side frames 207, 207'. Both side frames 207, 207' are identical so only one will be described in detail. Side frame 207 has an upright rear frame member 209. A first angled frame member 211 extends downwardly and forwardly from about the mid-point of the rear frame member 209. A second angled frame member 213 extends upwardly and forwardly from the top 215 of the rear frame member 209. An upright front frame member 217 extends between the two angled frame members 211, 213, located in front of, and generally parallel to, the rear frame member 209.

The two side frames 207, 207' are joined by top and bottom cradles 221, 223 and by a bottom saw housing 225. The top cradle 221 comprises a normally horizontal, U-shaped structural member having parallel side legs 227, 229 joined by a curved end 231. The cradle 221 is joined about midway along its side legs 227, 229 to the top free ends 233, 233' of the second angled frame members 213, 213' of the side frames 207, 207'. The top cradle 221 opens forwardly with its opening 235 at the front of the frame 203 and with its base 237 toward the back of the frame.

The bottom cradle 223 comprises a pair of side plates 241, 243 angled rearwardly and inwardly to connect to a central back plate 245. The front portion of the side plates 241, 243 is connected to the lower portion of the first angled frame members 211, 211' and also to the housing 225 as will be described. The bottom cradle 223 opens forwardly with its opening 249 at the front of the frame 203 and with its base 251 toward the back of the frame. The base 251 is normally vertically aligned with the base 237 of the top cradle 221.

The housing 225 includes a bottom plate 275; a curved vertical side wall 277 that extends from the front edge of one side plate 241 of the bottom cradle around the back to the front edge of the other side plate 243; and a generally conical cover plate 279 attached to the side wall 277 and to the sides of the side plates 241, 243. Within the housing 225 there is a bottom support plate 281 spaced a short distance above the bottom plate 275. The support plate 281 extends between the side wall 277 and the side plates 241, 243 and back plate 245 of the bottom cradle 223. A central casing 283 extends up from the support plate 281, through the cover 279 of the housing 225.

The bottom ends of the first angled frame members 217, 217' and the bottom ends of the rear frame members 209, 209' are attached to the cover 279 of the housing 225 to securely fix the side frames 207, 207' to the housing 225.

Three vertically spaced-apart horizontal cross-plates 295, 297, 299 extend in front of and between the front frame members 217, 217' for joining the side frames 207, 207' together. The top of the casing 283 connects to the bottom cross-plate 295 to strengthen the structure. Shallow depressions 301, 303, 305 can be provided in the front edges of the cross-plates 295, 297, 299 to receive cut trees therein. The backs of the depressions are normally aligned with the bases 237, 251 of the cradles 221, 223.

Cutting means 311 are provided at the bottom of the frame 203 for cutting through a tree. The cutting means 311 comprise a large circular saw 313 fixedly mounted in the housing 225 at the bottom of the frame 203. A hydraulic motor 315 is mounted in the top of the casing 283. A drive shaft 317 extends down from the motor 315 to the saw 313. Operation of motor 315 rotates saw 313 within housing 225.

Figure 11:
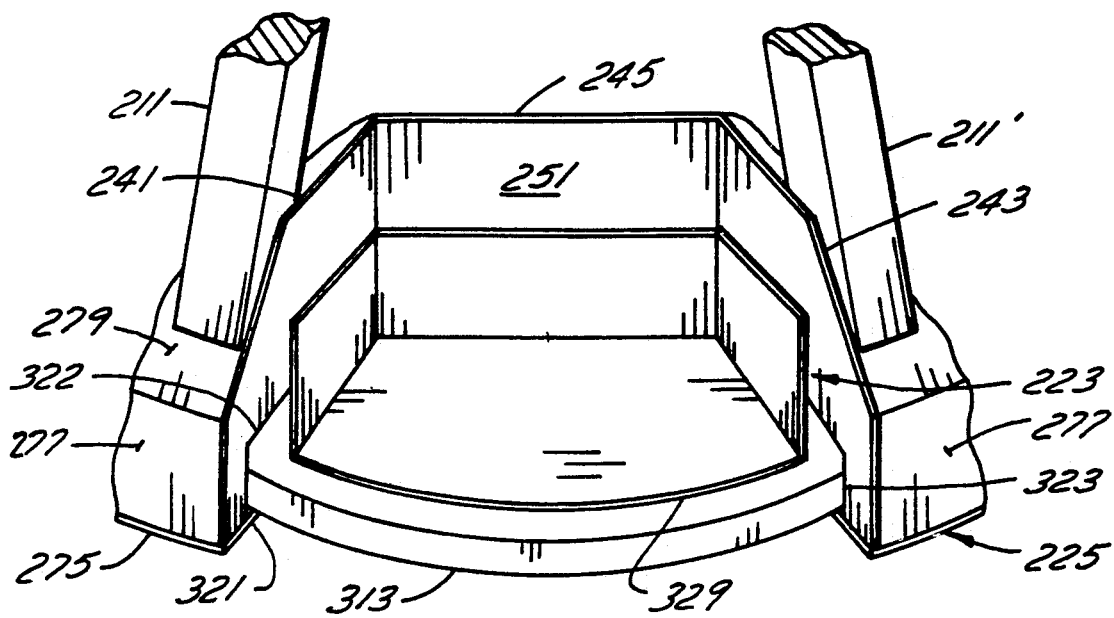
FIG. 11 is a front detail view of the lower part of the felling head.

The bottom plate 275 of the housing 225 has a U-shaped cutout 321 extending rearwardly drom its front edge as shown in FIG. 11. The cutout 321 corresponds to the cross-sectional shape of the bottom cradle 223 and is aligned with the side plates 241, 243 and the back plate 245 of the cradle. The saw 313 projects out into the open from the housing 225 well over the cutout 321. Openings 322, 323, 325 are provided in the side plates 241, 243 and back plate 245 to allow the saw 313 to project outwardly from the housing.

A butt plate 329 is mounted over part of the projecting portion of the saw 313. The butt plate 329 is fastened to the side plates 241, 243 and the back plate 245 and closes opening 325 and parts of openings 322, 323. The butt plate 329 lies closely adjacent to the top surface of the saw.

Figure 12:
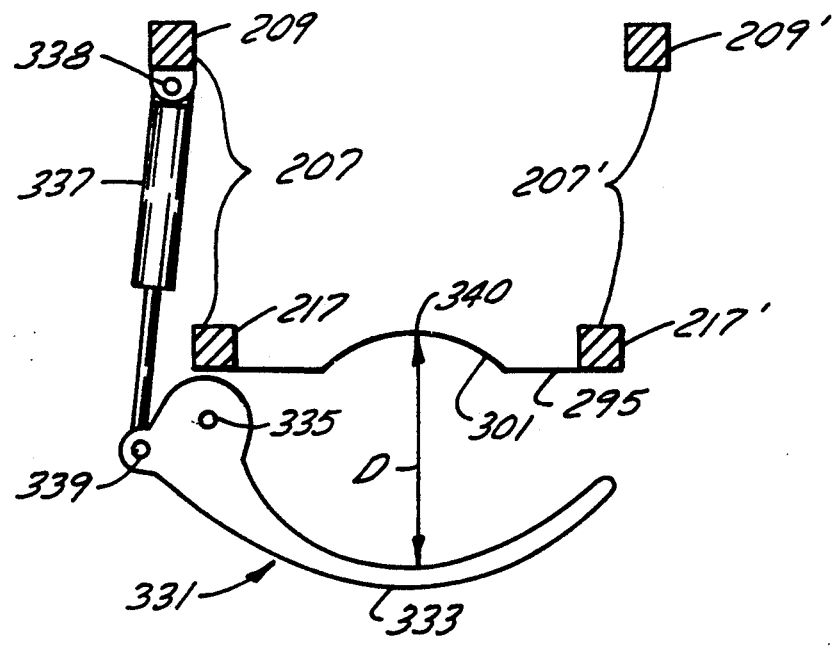
FIG. 12 is a cross-sectional view taken along line 12—12 of FIG. 10.

Retaining means 331 are provided on the felling head 201 for loosely retaining cut trees thereon. The retaining means 331 as shown in FIG. 12 comprise a curved arm 333 pivotally mounted by pivot means 335 to the frame in front of one of the front frame members 217 and on top of the bottom cross-plate 295. A hydraulic actuator 337 is located alongside the side frame 207 and is pivotally mounted thereto at one end by pivot means 338 and is pivotally mounted to the arm 333 at its other end by pivot means 339. The arm 333 is movable by the actuator 337 from an open, inoperative position where it extends outwardly and forwardly, and a closed operative position where it extends across the front of the frame effectively closing the cradles 221, 223.

The retaining arm 333, its mounting, and its actuator 337 are constructed so that with the actuator 337 at its full stroke, the arm 333 closes to a position where it is a minimum distance "D" from an imaginary vertical line 340 joining the bases 237, 251 of the top and bottom cradles 221, 223. This minimum distance allows several cut trees to be accumulated on the felling head while also permitting the last cut tree to be loosely held. This minimum distance preferably is about sixteen inches.

Grapple means 341, 343 are also provided on the frame 203 for tightly holding cut trees thereon. The grapple means 341 comprises a grapple arm 345 pivotally mounted by pivot means 347 to the front of the other side frame 207' and between cross-plates 297, 299. A hydraulic actuator 349 mounted alongside the side frame 207' moves the grapple arm 345 between an open position where it extends forwardly and outwardly and a closed operative position where it extends part way across the front of the frame 203. Grapple means 343 similarly comprises a grapple arm 351 pivotally mounted by pivot means 353 to the front of the first side frame 207 and to cross-plate 299. A hydraulic actuator (not shown) mounted alongside the frame 207 moves the grapple arm 351 between an open position where it extends forwardly and outwardly and a closed operative position where it extends part way across the front of the frame crossing with grapple arm 345 in its operative position.

Suitable means 357 are provided at the rear of the frame, centrally between the side frames 207, 207' for pivotally mounting the felling head on the end of a boom.

Figure 13:
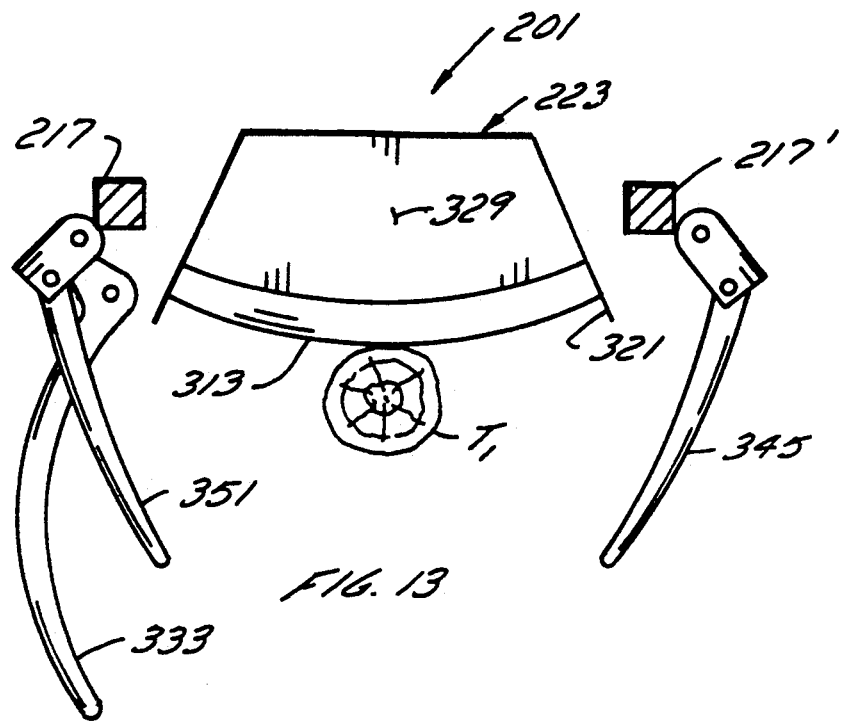
FIGS. 13 to 16 are schematic views showing the sequence of operations of the principle components of the felling head.
Figure 14:
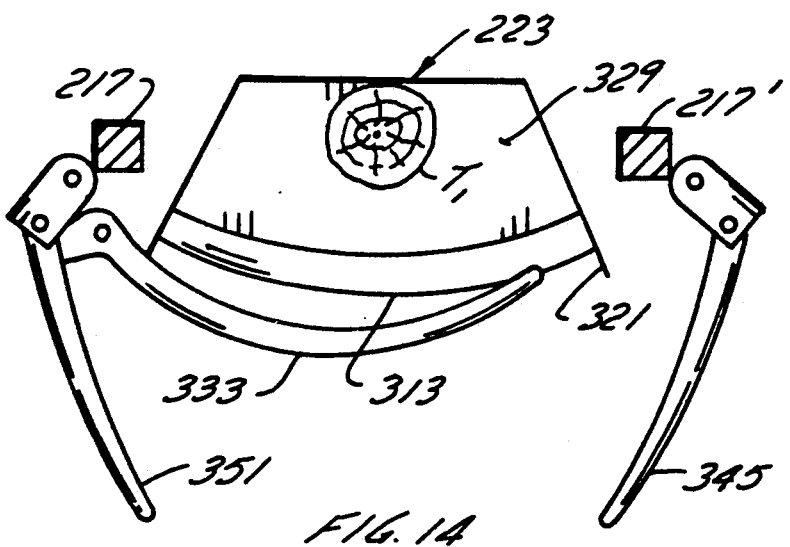
Figure 15:
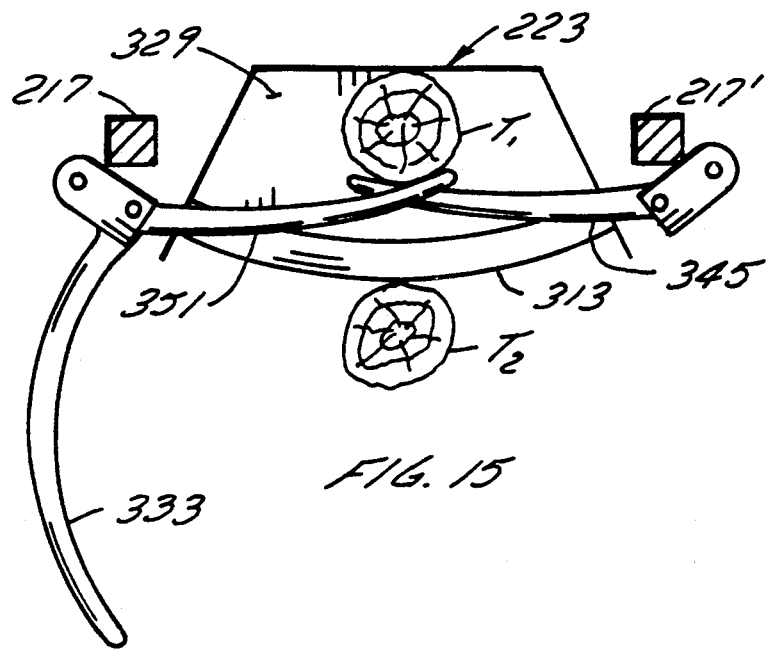
Figure 16:
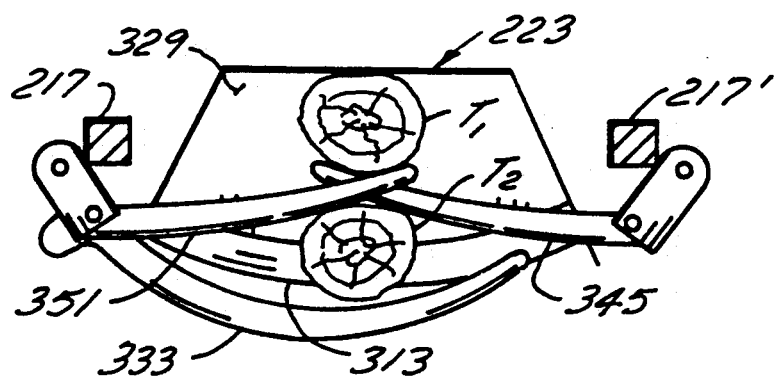

In operation, the felling head 201 is manoeuvered by the boom to place the exposed portion of the saw 313, within the cutout 321 and bottom cradle 223, adjacent a tree "T₁" to be cut as shown in FIG. 13. The retaining arm 333 and grapple arms 345, 351 are open. The felling head 201 is then moved forward to cut the tree, the cut tree "T₁" ending up resting on the butt plate 329. The retaining arm 333 is closed to loosely hold the cut tree "T₁" on the butt plate 329 within the top and bottom cradles 221, 223 as shown in FIG. 14 until the grapple arms 345, 351 are operated to tightly grip the tree "T₁". Retaining arm 333 is opened and the head 201 is moved to the next tree "T₂" to be cut as shown in FIG. 15. The head is moved forward to have the saw 313 cut through the second tree "T₂" which then also rests on the butt plate 329. The retaining arm 333 is immediately closed as shown in FIG. 16 to loosely hold the second cut tree "T₂" on the butt plate 329 within the cradles 221, 223 and in front of the grapple arms 345, 351 until the grapple arms can be operated to grip both the first and second trees "T₁", "T₂".

Each tree is cut free standing with no stress on the tree curing cutting so that splintering is avoided. Each cut tree is loosely held on the saw prior to accumulating so that it is not lost.

While the retaining arms 123, 333 have been described, along with their actuators 129, 337 as being structurally designed to move within a minimum distance of the bases of the cradles with the actuators fully extended, the positioning of the retaining arms could also be controlled by the operator. Thus, the operator can move the retaining arms, via the actuators, until he sees that they extend across the cradles loosely holding the tree therein. The operator stops movement of the arms once he sees that the tree is loosely held. The stopped position of the arms can vary since it is under the operator's control.

The retaining arms 123, 333 are moved to loosely hold a tree within the cradles and this normally means without contacting the tree. However it can happen, because of large trees aleady cut, and to be cut, that the arm 123 or arm 333 will contact the next tree to be cut. Normally this contact will be light and the tree being cut will have some limited movement so its chances of splintering during cutting are slight. If however the operator senses that the arm makes tight contact, then the accumulated trees are dumped before the next tree is cut to minimize splitting.

We claim:

1. A felling head having: a frame; tree cutting means at the bottom of the frame; two vertically spaced-apart, U-shaped, fixed cradles on the frame above the tree cutting means, each cradle having a closed base and an open mouth opening away from the frame; a retaining arm pivotally mounted on the frame between the cradles; means for moving the retaining arm between an open position where it is to one side of the mouth of the cradles and a closed position where it extends across the mouth of the cradles so as to close the cradles and to thereby loosely hold a cut tree within the cradles; a pair of grapple arms pivotally mounted on the frame between the cradles, one grapple arm on each side of the cradles; means to move the grapple arms between an open position where each is to one side of the cradles, and a closed position where each extends across the cradles to overlap and to tightly hold a cut tree against the base of the cradles; and means on the frame below the cradles for supporting a cut tree by its butt end while loosely retained in the cradles and before it is held by the grapple arms.

2. A felling head as claimed in claim 1 wherein the retaining arm in the closed position lies a predetermined minimum distance from an imaginary vertical line joining the bases of the cradles.

3. A felling head as claimed in claim 1 wherein the retaining arm in the closed position lies no closer than sixteen inches to an imaginary vertical line joining the bases of the cradles.

4. A felling hed as claimed in claim 1 wherein the pivotal mounting of the retaining arm is located forwardly of the pivotal mounting of the grapple arms.

5. A felling head as claimed in claim 1 including means movably mounting the tree cutting means on the frame; means for moving the tree cutting to cut through a free-standing tree positioned within the cradles by manoeuvring the felling head; the means supporting the cut tree comprising the tree cutting means.

6. A felling head as claimed in claim 1 where the tree cutting means are fixed on the frame; and the cut tree support means comprise a butt plate covering a portion of the tree cutting means.

* * * * *

UNITED STATES PATENT AND TRADEMARK OFFICE
CERTIFICATE OF CORRECTION

PATENT NO. : 5,004,026

DATED : April 2, 1991

INVENTOR(S) : Charles Maclennan, Douglas D. Hamilton, Robert M. Palfy

It is certified that error appears in the above-identified patent and that said Letters Patent is hereby corrected as shown below:

```
COLUMN 9:
Claim 5, line 3, change "tree cutting" to --tree cutting
means--.
```

Signed and Sealed this

Twentieth Day of October, 1992

*Attest:*

DOUGLAS B. COMER

*Attesting Officer*    *Acting Commissioner of Patents and Trademarks*